Nov. 10, 1925. Re. 16,209

O. H. JUSTUS

PURIFIER FOR GASOLINE SYSTEMS

Original Filed Jan. 8, 1921

Inventor

Ora H. Justus,

By O. H. Justus.

Attorney

WITNESS:-

Grace C. May

Reissued Nov. 10, 1925. Re. 16,209

UNITED STATES PATENT OFFICE.

ORA H. JUSTUS, OF PARKERSBURG, WEST VIRGINIA.

PURIFIER FOR GASOLINE SYSTEMS.

Original No. 1,464,822, dated August 14, 1923, Serial No. 435,909, filed January 8, 1921. Application for reissue filed August 8, 1925. Serial No. 49,152.

*To all whom it may concern:*

Be it known that I, ORA H. JUSTUS, a citizen of the United States, residing at Parkersburg, in the county of Wood and State of West Virginia, have invented certain new and useful Improvements in Purifiers for Gasoline Systems, of which the following is a specification.

This invention relates to certain new and useful improvements in purifiers for gasoline systems, and the primary object thereof is to provide a device which can be interposed in the gasoline feed line of any type or make of automobile in any easy, quick and simple manner.

A further object of the invention is to provide a device of this type which may be carried by the dash so as to thereby not subject the feed line to the weight or tension incident to support of the device.

A still further object of the invention is to provide a device of this type which embodies a standard type of bottle, found in nearly every household, so that in case of breakage ready substitution may be made without obtaining a special type of receptacle from the manufacturer of the device.

A still further object of the invention is to provide a structure, wherein the bottle can be removed by the simple manipulation of a pair of wing nuts.

The invention still further aims to provide a device of this character which can be most economically produced, which involves a minimum number of parts, which is effective in operation, and which in the instance of certain makes of automobiles can be installed by use of the original gasoline feed line or piping.

Figure 1:
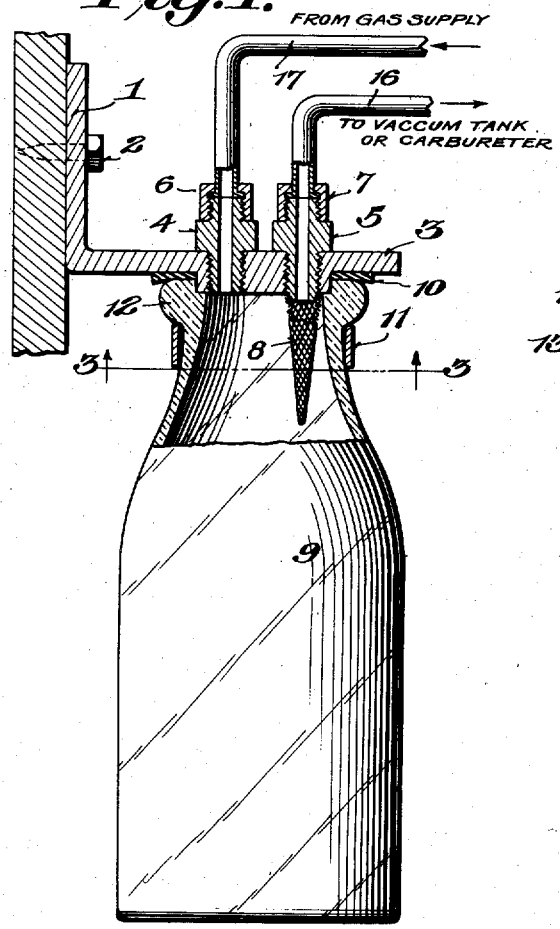
Figure 1, is a side elevation of the invention, partly broken away and in section.
Figure 2:
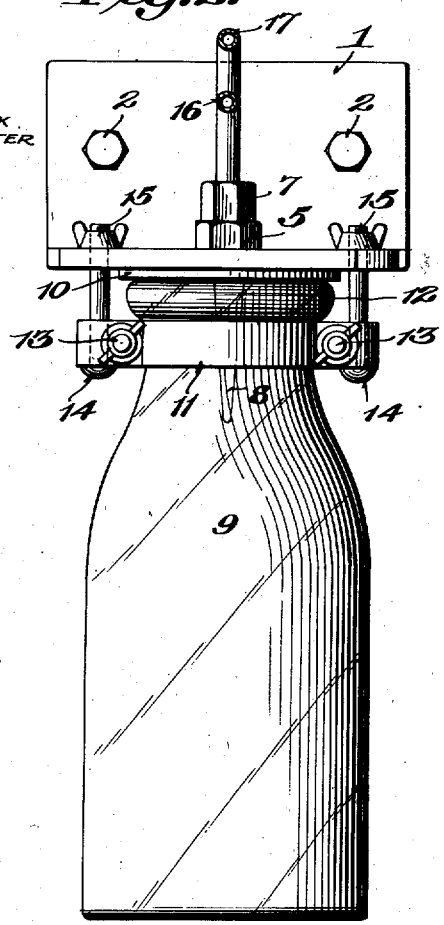
Figure 2, is a front elevation.
Figure 3:
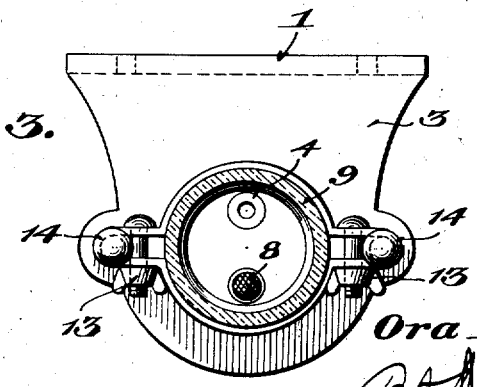
Figure 3, is a section on line 3—3 of Figure 1.

In proceeding in accordance with the present invention, a bracket is employed, preferably of approximately L-shape as depicted in the drawings, the vertical member 1 of the bracket being secured by suitable fastenings 2 to dash D of the automobile and beneath the hood of the latter.

The horizontal part or table 3 of the bracket is provided with nipples 4 and 5, of which 4 constitutes the inlet and is connected by a coupling 6 to the pipe or line leading from the gasoline tank, while the nipple 5 constitutes the outlet and is connected by a coupling 7 to the pipe or line which leads to the carbureter or to the vacuum tank in the instance of vacuum systems.

A strainer 8 of fine mesh is connected to the outlet and depends from the table 3 into a bottle 9 of standard type of manufacture, more familiarly known or recognized as a milk-bottle.

The mouth of the bottle is impinged against a suitable washer or gasket 10 which engages beneath the table 3 in surrounding relation to the nipples 4 and 5, and is fixedly held in position through the medium of a clamp 11 which engages about the bottle neck and beneath the customary bead or enlargement 12 that such bottles are molded with.

Transverse bolts equipped with wing or thumb nuts 13 are employed to cause the clamp to snugly and conformably engage about the bottle neck, while vertically disposed bolts 14 equipped with wing or thumb nuts 15 are employed to suspend the bottle from the bracket table, the bolts 15 engaging through the clamp ends. Thus upon tightening of the wing nuts 15, the bottle mouth may be adjustably drawn against the gasket 10 and the latter in turn drawn against the under side of the table of the bracket to effect an air-seal thereby.

It will be now apparent that the gasoline enters the bottle, and must pass through the strainer before it can reach the carbureter. Consequently all foreign substances will be held or trapped in the bottle and sediment including water as it collects within the bottle will gravitate to the bottom thereof, and can be removed by simple manipulation of the wing nuts 15 to enable the bolts 14 to be withdrawn from the bracket table. It will be understood that in this removal operation to cleanse the bottle, the bottle clamp need not be disturbed. However, in event of breakage of the bottle, the clamp is removed and applied to a new bottle, and since the type of the latter is such as is found in nearly every household, no special part is required as to this part of the invention.

In the instance of certain types of cars, it is merely necessary to attach the bracket to the dash, and to then disconnect the pipe from the gasoline source to the vacuum tank, and connect same to the nipple 4. A short piece of pipe 16 is then connected to the nipple 5 and to the vacuum tank or carbureter. Since the bracket receives support from the dash, it will be obvious that the pipe is not subjected to any strain or pressure in the support of the device.

In addition, it will be observed that the operation of applying and removing the bottle is had by the operating of the wing nuts 15 above the table and consequently at points isolated from the bottle itself, thus reducing breakage of the latter to a minimum.

Obviously the strainer may be of any desired type to effectively function and at the same time to allow free flow of the gasoline into the carbureter.

Since as is well known, milk bottles whether of quart, pint or gill size equally possess the same mouth structure as regards size it is therefore possible to use any bottle of the foregoing capacities equally as well.

It will be also seen that in case of breakage of the bottle while on the road, the coupling 6 may be removed and the pipe 17 from the gasoline supply may be connected to the carbureter or vacuum tank, which will in effect be restoration to the original condition of the car, or the condition existing prior to incorporation of the present invention.

The clamp holds the bottle rigidly in position and against all vibrations so as to eliminate danger of breakage during the car movements.

What is claimed is:

1. In a gasoline system, a substantially L-shaped bracket formed for connection to the dash of an automobile, the horizontal member of the bracket having an inlet and an outlet, a bottle of standard type of manufacture, a gasket beneath said bracket member, a clamp removably engaged about the bottle neck and with the customary bead at the mouth thereof, vertical bolts extending through said bracket member and the clamp, wing nuts on the bolts engaged with the upper face of the bracket member to draw the bottle mouth against the gasket, and transverse bolts at the clamp ends to draw the latter into snug engagement with the bottle neck.

2. In a gasoline system, a bracket formed for connection to the dash of an automobile, a bottle of standard type of manufacture, a gasket interposed between the bottle mouth and the bracket, a clamp arranged about the bottle neck, an inlet and an outlet in the bracket, vertical bolts connected to the clamp and extending through the bracket, and wing nuts on the bolts engaging on top of the bracket to draw the bottle against the gasket.

3. In a gasoline system, a bracket formed for connection to the dash of an automobile, a receptacle having a bead adjacent its mouth, a gasket interposed between the receptacle mouth and the bracket, a clamp arranged about the receptacle mouth and engaged with and beneath the bead, an inlet and an outlet in the bracket, and a series of independent means to connect the clamp to the bracket to thereby draw the receptacle against the gasket.

4. In a gasoline system, a bracket formed for connection to the automobile and having an inlet and an outlet, a receptacle having a bead adjacent its mouth and engaged at its mouth beneath the bracket, means engaged with said bead and having parts extending through the bracket to suspend the receptacle from the bracket, and adjustable means on said parts of the suspending means to draw the receptacle into engagement with the bracket.

5. In a gasoline system, a bracket formed for connection to the automobile and having an inlet and an outlet, a receptacle having an outwardly extending abutment adjacent its mouth, a holder for the receptacle removably engaged therewith and beneath and against said abutment, and means independent of the holder to suspend said holder from the bracket.

6. In a gasoline system, a bracket, a receptacle having a bead adjacent its mouth, a clamp removably engaged about the receptacle and with the bead, a series of means each independently operable from above the bracket to connect the clamp to the bracket, and an inlet and an outlet for the receptacle carried by the bracket.

7. In a gasoline system, a bracket having an inlet and an outlet, a receptacle having an outwardly extending abutment adjacent its mouth, a holder engaged about the receptacle and with the abutment, and a series of independent fasteners for the holder each engaged with the holder and extending into the bracket so as to be independently operable.

8. In a gasoline system, a bracket having an inlet and an outlet, a receptacle having an outwardly extending abutment adjacent its mouth, a clamp removably engaged with the receptacle and against the abutment, and adjustable means engaged with the clamp and extending through the bracket to suspend the receptacle from the bracket so as to regulably effect engagement of the receptacle with the bracket.

In testimony whereof I affix my signature.

ORA H. JUSTUS.